(No Model.)                                      3 Sheets—Sheet 2.
T. W. & C. L. AMES.
BALING PRESS.
No. 268,974.                               Patented Dec. 12, 1882.
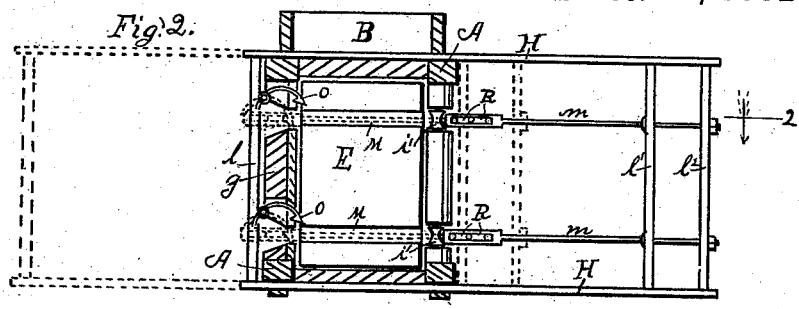
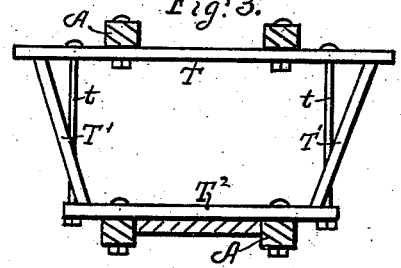
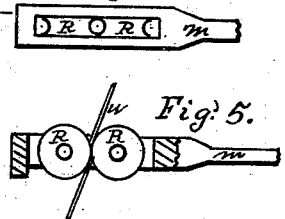
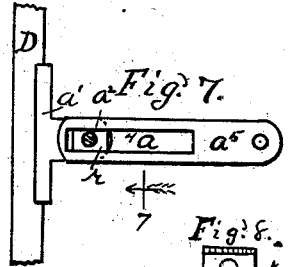
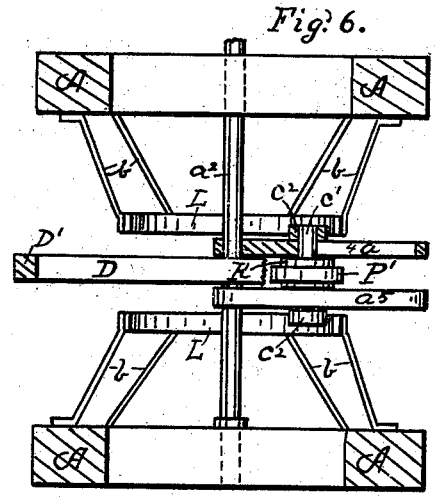
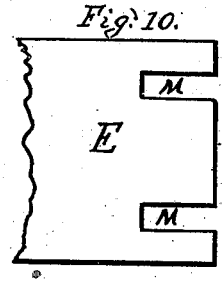
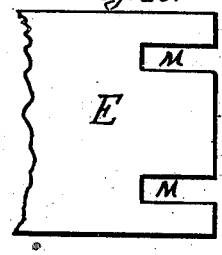
Witnesses.
Thos. H. Hutchins.
Wm. J. Hutchins.
Inventors.
Thomas W. Ames.
Chester L. Ames.

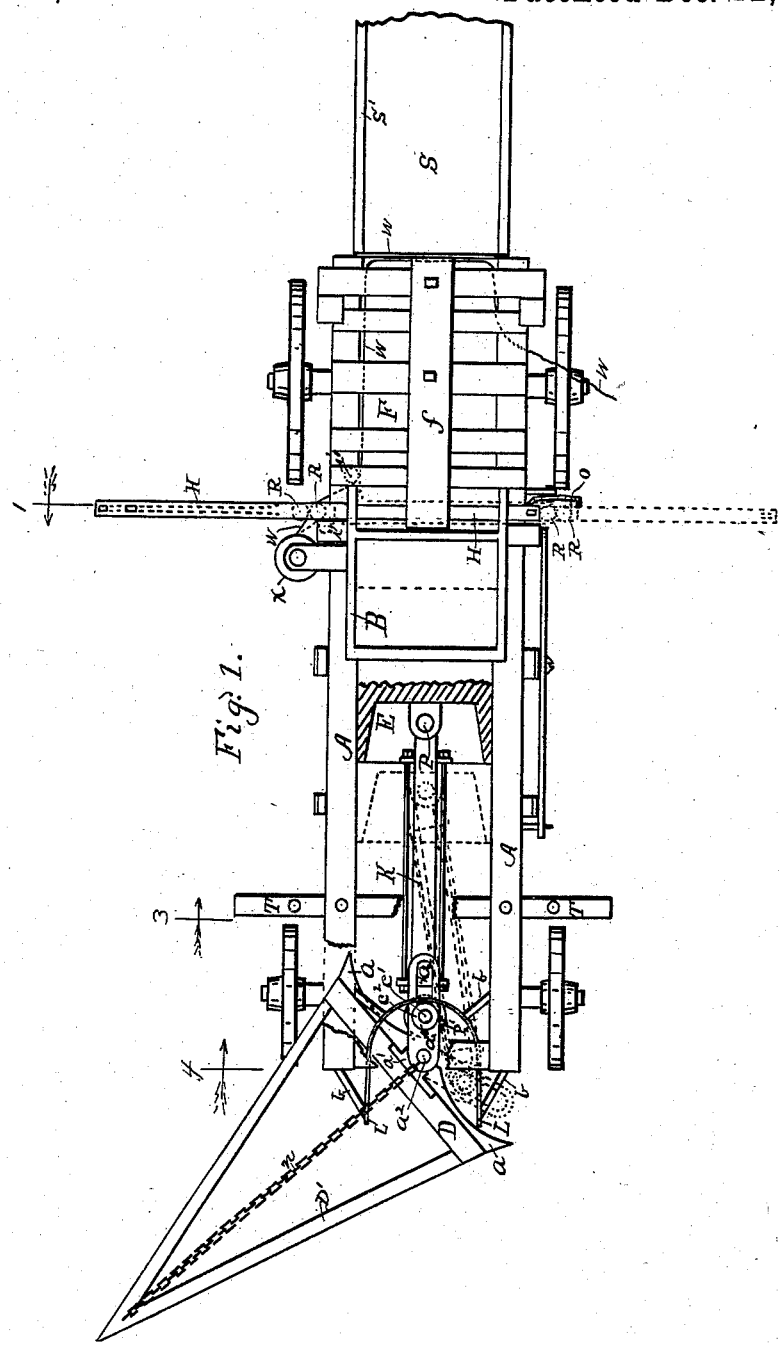

(No Model.)
T. W. & C. L. AMES.
BALING PRESS.
No. 268,974.
3 Sheets—Sheet 3.
Patented Dec. 12, 1882.
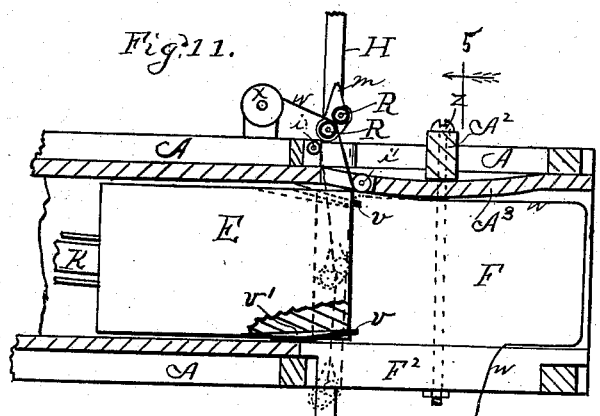
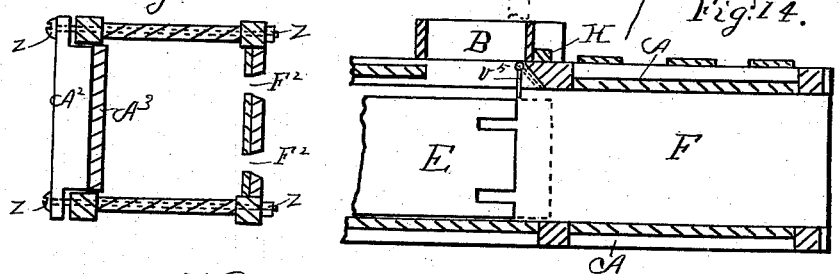
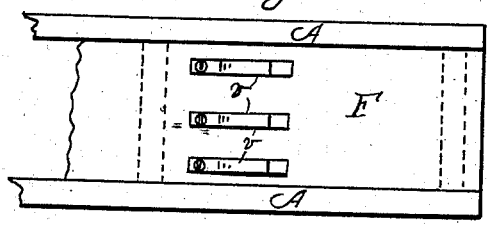
Witnesses.
Thos. B. Hutchins
Henry J. Hutchins
Inventors.
Thomas W. Ames.
Chester L. Ames.

UNITED STATES PATENT OFFICE.

THOMAS W. AMES AND CHESTER L. AMES, OF CABERY, ILLINOIS.

BALING-PRESS.

SPECIFICATION forming part of Letters Patent No. 268,974, dated December 12, 1882.

Application filed February 25, 1882. (No model.)

*To all whom it may concern:*

Be it known that we, THOMAS W. AMES and CHESTER L. AMES, of Cabery, in Ford county, in the State of Illinois, have invented certain new and useful Improvements in Baling-Presses, the construction and operation of which we will proceed to explain, reference being had to the annexed drawings and the letters and figures thereon, in which—

Figure 1 is a plan view on the top; Fig. 2, a vertical cross-section of Fig. 1, looking in the direction of the arrow on line 1; Fig. 3, a vertical cross-sectional view of Fig. 1 on line 3, looking in the direction of the arrow; Fig. 4, a side view of the arm $m$ that carries forward the baling-wire; Fig. 5, a plan view on the top of the same on the line 6; Fig. 6, a vertical cross-sectional view on line 4, Fig. 1, looking in the direction of the arrow; Fig. 7, a plan view on the top of the inner end of the sweep D' on the cross-bar D. Fig. 8 is a top view on the box $r$; Fig. 9, a cross-sectional view of Fig. 7 on line 7; Fig. 10, a plan view on the top of a portion of the follower E; Fig. 11, a plan view on the top of Fig. 2 on line 2; Fig. 12, a vertical cross-sectional view of the baling-chamber on the line 5, Fig. 11, looking in the direction of the arrow; Fig. 13, an elevation of the interior of the chamber in which the follower E travels, on one side showing the retainers $v$; and Fig. 14, a central vertical longitudinal sectional view through the machine.

This machine is for the purpose of baling hay or other loose and fibrous material by forcing the loose material into a bale-chamber by successive additional charges and tying the bale while it is within the bale-chamber before it is discharged by a succeeding newly-formed bale. The machine is of the class known as "horizontal" or "procumbent" machines.

This invention relates to certain improvements in the machine for which Letters Patent were granted by the United States to these applicants June 7, 1881, No. 242,421, and for that reason we will not do more than explain the several features in this invention that are deemed to be improvements on the said patented machine.

The first in order of said improvements consists in the construction of the double cam on the inner end of the swinging sweep D', and the swinging cranks $a^5$, attached to the pitman $k$, that operates the follower E, in order to obtain a better purchase on the outer end of the pitman $k$ to throw it back easier. The pin $a^2$, Figs. 1 and 6, forms the pivot or hinge to which the inner end of the sweep D' and the swinging cranks $a^5$ are hinged.

The construction of the double cam is shown in Fig. 1, and consists of the beam D, pivoted at its center at its side, as shown, to the pin $a^2$, on which it rocks from side to side, as the sweep D vibrates. The face of the beam D next the machine is provided with the concave faces $a$ at either side of the pin $a^2$ extending from the said pin out to the ends of said beam, upon which concave faces $a$ the friction-roller P' rolls alternately as the sweep D' vibrates to reciprocate the follower, as hereinafter stated.

The swinging crank $a^5$ is constructed in halves—one above and one below the double cam D on the inner end of the sweep D'—as shown in Fig. 6. They also inclose the outer end of the pitman $k$, as is shown in said figure, so that it operates back and forth between them, the said pitman being held in between the swinging cranks by means of the pin $c'$, which operates in the slot $4^a$ back and forth, as shown in Figs. 1 and 5. The end of the connecting-rod or pitman $k$ between the two swinging cranks $a^5$ is provided with the friction-roller P', Fig. 6, which rolls in the two concave surfaces $a$ of the cam D alternately as it swings first to one side and then to the other to reciprocate its said pitman. The pin $c'$ is also provided at either end outside the swinging cranks with the friction-rollers $c^2$, Fig. 6, which roll against the inner surface of the track-guides L, shown more particularly in Fig. 6. These track-guides L are supported and attached to the machine by the braces $b$ $b$.

By this construction of the parts mentioned the operation of the machine is very much easier, and requires very much less power to press a bale than it did without the rollers. When the pitman and swinging cranks are in the position shown by the dotted lines in Fig. 1, the rollers $c^2$ are permitted to travel to the outer end of the slots $4^a$ by reason of the form of the track-guides L, by means of which the pitman is carried considerable distance forward of the pin $a^2$, to enable the follower E to come far enough back. When the sweep D' begins to swing it brings one of the concave surfaces $a$ in contact with the roller P' on the end of the pitman $k$, while the other two rollers, $c^2$, roll on the inner surface of the track-guides $l$ until the pitman is brought to the center and on a line with the length of the machine, as shown in Fig. 1. By the use of these rollers $c^2$ and P' and the track or guides L the friction of the parts is lessened more than one-half, and the pitman is allowed a longer motion than if the pitman were hinged to the outer end of the swinging crank, as in the ordinary manner.

The next improvement is in the construction of the frame A or in the method of strengthening it at the head or sweep end, so that it will not skew from one side to the other on the top as the sweep D' swings from side to side. This is accomplished by the addition of the cross-beams T and $T^2$, Fig. 3, which are placed across the frame A just in the rear of the front wheels of the machine, as shown in Fig. 1, to be out of their way, and are firmly bolted to the frame A, as shown in Fig. 3. The outer ends of the said beams T and $T^2$ are held together by the rods $t\ t$ in such manner as to hold the braces T' securely in place, which thoroughly brace the body of the machine so its top will not skew or sway over from one side to the other.

The next improvement is in the device for manipulating the baling-wire $w$ to pull it through the machine so the bale can be tied. This device is shown more particularly in Figs. 2 and 11, and consists of the frame H, which incloses the machine transversely to its length at the point on line 1, Fig. 1, just at the point where the wire $w$ is pulled through. The frame H is provided with a pair of arms, $m$, supported in the frame H by the beams $l'\ l^2$, Fig. 2, which arms $m$ are provided at their outer ends with a pair of grooved sheaves, R, as shown in Figs. 4 and 5 more clearly, between which the baling-wire passes off the spool $x$ on the outer side of the machine, as shown in Fig. 11. The frame H is free to side back and forth across the machine to carry the wire $w$ through the machine, as will be further explained. In Fig. 11 the position of the wire $w$ is as it will be when a bale is formed and ready to be bound. The frame H is then shoved forward across the machine, causing the arms $m$ to slide through the slots M M in the face of the follower E, carrying the wire $w$ forward between the two sheaves R R until the wire $w$ is in the form shown by the dotted lines, Fig. 1, the sheaves R having arrived at the opposite side of the machine from which they started, and having carried the wire $w$ forward in the form of a loop, which loop is caught by the hook $o$, (shown more particularly in Fig. 2,) to hold the wire at that point until the frame H returns, the sheaves returning on the spool end of the wire, as shown in Fig. 11 by the dotted lines. After the sheaves have returned to their starting-point the operator catches the loop of the wire $w$ at the hook $o$ and pulls it through far enough so he can cut the wire off at the loop, the cut-off end forming a tie for the bale, while the spool end will be carried back by the bale until it is in the form again as shown in Fig. 11, ready to have another like operation performed. The friction-rollers $i$ and $i'$ are for the wire $w$ to run over, so as not to wear the machine. By this means all the labor of baling the hay and tying the bale is performed from one side of the machine without having to go around to the opposite side every time a bale is formed; and, lastly, consists in the combination of the double cam D, slotted lever $a^5$, slide $r$, and pitman $k$, for purposes hereinafter to be related.

The flexible side $A^3$ of the baling-chamber may be contracted (as shown in Fig. 11) by means of the beam $A^2$ and the cross-rods $z$ provided with nuts, as shown in Fig. 12.

To give greater frictional contact of the walls of the bale-chamber to the bale while it is being formed, the beam $A^2$, Figs. 11 and 12, is arranged to stand vertically against the outer side of the baling-chamber at or near its center. The rods $z$, Fig. 12, are passed through either end of the beam $A^2$ and through the frame of the machine, and are provided with nuts on their outer ends, by means of which the side $A^3$ of the baling-chamber may be bowed in toward the bale, forming a narrower passage at that point for the bale to pass through, so as to form greater resistance to the follower and cause it to make a more compact bale than if the bale-chamber were straight, and forming a means of making the pressure greater or less as may be desired by reason of the parts being adjustable so as to regulate the contraction or expansion of the baling-chamber. One side only is shown bowed in or contracted for said purpose, but both sides may as well be so arranged. One side of the baling-chamber is furnished with the ordinary tying slots $F^2$, as is shown in Fig. 12 for the passage of the baling-wire.

Having thus described our invention, what what we claim as new, and desire to secure by Letters Patent, is as follows, to wit:

1. In a procumbent baling-press, the double cam D, having the concave faces $a$ and sweep D', in combination with the double swinging crank $a^5$, having the slot $4^a$, pin $c'$, pin $a^2$, friction-rollers $c^2$ and P', track-guides L, pitman $k$, and follower E, all arranged to operate in the manner and for the purpose set forth.

2. In a procumbent baling-press, the beams T and $T^2$, rods $t\ t$, and braces T', in combination with the frame A, in the manner and for the purpose set forth.

3. In a procumbent baling-press the frame H having the arms $m$, provided with the sheaves R R, in combination with the frame A and slotted follower E, all arranged to operate in the manner substantially as and for the purpose set forth.

4. The combination of the double cam D, slotted lever $a^5$, slide $r$, and pitman $k$, for the purpose set forth.

THOMAS W. AMES.
CHESTER L. AMES.

Witnesses:
Thos. H. Hutchins,
Wm. J. Hutchins.